Patented Nov. 3, 1959

2,911,445
ISOMERIZATION OF UNSATURATED DIOLS

Herbert Friederich, Worms, Germany, assignor to Badische Anilin- & Soda-Fabrik Aktiengesellschaft, Ludwigshafen am Rhine, Germany No Drawing. Application July 27, 1956
Serial No. 600,402

Claims priority, application Germany August 2, 1955

10 Claims. (Cl. 260—635)

This invention relates to an improved process for the isomerization of unsaturated diols. It relates especially to a process for the conversion of $\Delta_2$-1.4-diols into $\Delta_3$-1.2-diols and of $\Delta_3$-1.2-diols into $\Delta_2$-1.4-diols.

It is already known that certain unsaturated alcohols, upon being heated and/or under the action of acids or alkalies, undergo an isomerization known as allyl rearrangement, by which a migration of the OH-group to the carbon atom in beta-position takes place with a displacement of the C=C double linkage. Hitherto unsaturated diols could not be isomerized in this way because side reactions occurred.

I have now found that unsaturated diols of the general Formulae I and II, in which R and R' are hydrogen, lower alkyl, aralkyl, cycloalkyl or aryl, can be isomerized or converted into a mixture of I and II by treatment with a small amount of a water-soluble mercury-(II)-salt:

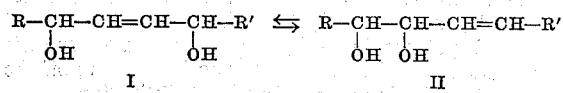

As initial materials there are suitable for example the cis-trans isomeric forms of butene-(2)-diol-(1.4) or of butene-(3)-diol-(1.2) (in which R and R' are both hydrogen) and the hexene diols (in which R and R' both represent the methyl group).

It is preferable to proceed by adding to the unsaturated diol the amount of water and, if necessary, of saturated alcohols, ether alcohols or cyclic ethers necessary to dissolve it and then the mercury salt and if desired a little mineral acid. As mercury salts there are suitable for example mercury-(II)-sulfate, chloride or acetate; mercury oxide may also be used which forms the corresponding salt with the mineral acid, in particular sulfuric acid, also added. In general about 0.1 to 10 percent by weight of the mercury salt are used with reference to the amount of diol, and about the same amount of concentrated sulfuric acid.

The isomerization takes place slowly at ordinary temperature. It may be favored by heating, for example by boiling the reaction mixture. The most favorable amounts in any case and the temperatures necessary for the rapid formation of the equilibrium I⇌II differ somewhat; they may readily be ascertained by preliminary experiment. This is also true for the amount of water to be added. When working without the addition of water, or if only a small amount thereof is used, more or less large amounts of divinyldioxane-(1.4) are formed from the vinyl glycol II by the splitting off of water.

The reaction mixture may readily be worked up; since the isomeric diols I and II and also any divinyl dioxane-(1.4) formed have different boiling points, they may be directly separated by fractional distillation.

The process may also be carried out continuously.

The process makes it possible to prepare the desired isomers from industrially accessible unsaturated diols of the type I or II.

The unsaturated diols are valuable intermediate products, in particular for plastics and for pharmaceutical products.

The following examples will further illustrate this invention but the invention is not restricted to these examples. The parts specified are parts by weight.

Example 1

1 part of mercury-(II)-sulfate and 1 part of concentrated sulfuric acid are added to a mixture of 100 parts of water and 300 parts of cis-butene-(2)-diol-(1.4) and the whole heated to boiling for 1 hour while stirring under reflux. It is then neutralized with caustic alkali solution to the pH value 6, filtered, the water distilled off and the residue subjected to fractional distillation under reduced pressure. 111 parts of butene-(3)-diol-(1.2) thereby pass over at 105° to 107° C. at a pressure of 16 torr. As a residue there remains cis-butene-(2)-diol-(1.4) which may again be subjected to the rearrangement.

Example 2

1 part of mercury-(II)-chloride is added to a solution of 300 parts of trans-butene-(2)-diol-(1.4) in 100 parts of water and boiled under reflux for 8 hours. 65 parts of butene-(3)-diol-(1.2) are obtained by working up as in Example 1.

Example 3

300 parts of trans-butene-(2)-diol-(1.4) are boiled for 1 hour under reflux after the addition of about 0.5 part of mercury-(II)-sulfate but without the addition of water. The reaction mixture is neutralized and then filtered. By fraction distillation there are obtained 81 parts of divinyl-dioxane-(1.4) of the boiling point 77° C. at 15 torr, and 60 parts of butene-(3)-diol-(1.2) of the boiling point 100° to 102° C. at 15 torr, and also butene-(2)-diol-(1.4).

Example 4

1 part of mercury-(II)-sulfate and 1 part of concentrated sulfuric acid are added to a solution of 300 parts of butene-(3)-diol-(1.2) in 100 parts of water and heated to boiling under reflux for 1 hour. By working up as in Example 1 there are obtained 72 parts of trans-butene-(2)-diol-(1.4) as well as unchanged butene-(3)-diol-(1.2).

Example 5

1 part of mercury-(II)-sulfate and 0.5 part of concentrated sulfuric acid are added to a solution of 300 parts of cis-butene-(2)-diol-(1.4) in 100 parts of water, whereupon the mixture is allowed to stand at 25° C. for 8 hours. By working up as in Example 1 there are obtained 50 parts of butene-(3)-diol-(1.2) and a cis-trans isomer mixture of butene-(2)-diols-(1.4).

What I claim is:

1. A process for the isomerization of an unsaturated diol of the class consisting of diols of the general formulae

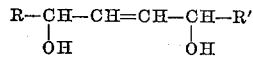

and

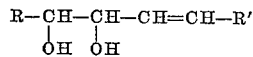

in which R and R' represent a member of the class consisting of hydrogen and lower alkyl groups, which process comprises adding to one of the said unsaturated diols from about 0.1 percent by weight up to about 10 percent by weight of a water-soluble mercuric-(II)- salt to effectuate isomerization of said diol into the other of said diols, neutralizing the mixture and subjecting it to a fractional distillation.

2. A process for the isomerization of an unsaturated diol of the class consisting of diols of the general formulae

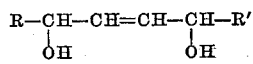

and

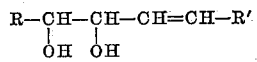

in which R and R' represent hydrogen, which process comprises adding to one of the said unsaturated diols from about 0.1 percent by weight to about 10 percent by weight of a water soluble mercuric-(II)-salt to effectuate isomerization of said diol into the other of said diols, boiling the mixture, neutralizing it and subjecting it to a fractional distillation.

3. A process for the isomerization of an unsaturated diol of the class consisting of diols of the general formulae

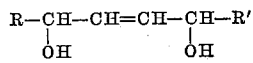

and

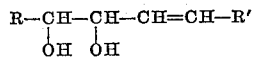

in which R and R' represent a member of the class consisting of hydrogen and lower alkyl groups, which process comprises adding to one of the said unsaturated diols in the presence of water from about 0.1 percent by weight up to about 10 percent by weight of a water-soluble mercuric-(II)-salt to effectuate isomerization of said diol into the other of said diols, boiling the mixture, neutralizing it, distilling off the water and subjecting it to a fractional distillation.

4. A process for the isomerization of an unsaturated diol of the class consisting of diols of the general formulae

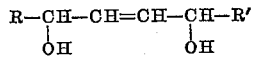

and

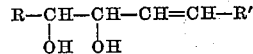

in which R and R' represent a member of the class consisting of hydrogen and lower alkyl groups, which process comprises adding to one of the said unsaturated diols in the presence of water from about 0.1 percent by weight up to about 10 percent by weight of a water-soluble mercuric-(II)-salt and from about 0.1 percent by weight up to about 10 percent by weight of concentrated sulfuric acid to effectuate isomerization of said diol into the other of said diols, neutralizing the mixture, distilling off the water and subjecting it to a fractional distillation.

5. A process for the isomerization of an unsaturated diol of the class consisting of diols of the general formulae

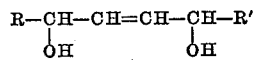

and

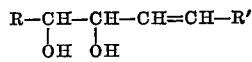

in which R and R' represent hydrogen, which process comprises adding to one of the said unsaturated diols in the presence of water from about 0.1 percent by weight up to about 10 percent by weight of a water-soluble mercuric-(II)-salt and from about 0.1 percent by weight up to about 10 percent by weight of concentrated surfuric acid to effectuate isomerization of said diol into the other of said diols, neutralizing the mixture, distilling off the water and subjecting it to a fractional distillation.

6. A process for isomerizing cis-butene-(2)-diol-(1.4) into butene-(3)-diol-(1.2) which comprises adding to the cis-butene-(2)-diol-(1.4) in the presence of water about 0.3 percent by weight of mercury-(II)-sulfate and about 0.3 percent by weight of concentrated sulfuric acid, boiling the mixture, neutralizing it (distilling off the water and subjecting it to a fractional distillation.

7. A process for isomerizing trans-butene-(2)-diol-(1.4) into butene-(3)-diol-(1.2) which comprises adding to the transbutene-(2)-diol-(1.4) in the presence of water about 0.3 percent by weight of mercury-(II)-chloride, boiling the mixture, neutralizing it, distilling off the water and subjecting it to a fractional disillation.

8. A process for isomerizing trans-butene-(2)-diol-(1.4) into butene-(3)-diol-(1.2) which comprises adding to the trans-butene-(2)-diol-(1.4) about 0.1 part by weight of mercury-(II)-sulfate, boiling the mixture, neutralizing it and subjecting it to a fractional distillation.

9. A process for isomerizing butene-(3)-diol-(1.2) into trans-butene-(2)-diol-(1.4) which comprises adding to the butene-(3)-diol-(1.2) in the presence of water about 0.3 percent by weight of mercury-(II)-sulfate and about 0.3 percent by weight of concentrated sulfuric acid, boiling the mixture, neutralizing it, distilling off the water and subjecting it to a fractional distillation.

10. A process for isomerizing cis-butene-(2)-diol-(1.4) into butene-(3)-diol-(1.2) which comprises adding to an aqueous solution of the cis-butene-(2)-diol-(1.4) about 0.3 percent by weight (with reference to the diol) of mercury-(II)-sulfate and about 0.1 percent by weight (with reference to the diol) of concentrated sulfuric acid, allowing the mixture to stand at about 25° C. for about 8 hours, neutralizing the mixture, distilling off the water and subjecting it to a fractional distillation.

References Cited in the file of this patent

UNITED STATES PATENTS 2,435,078    Hearne et al.    Jan. 27, 1948

OTHER REFERENCES

Braude: Chemical Soc., Annual Reports, vol. 46, 1950, pp. 125–31.

Remy: "Treatise on Inorg. Chem.", vol. II, Elsevier, N.Y., 1956; pp. 462, 463, 468, 472–3.